(12) United States Patent
Dan et al.

(10) Patent No.: US 6,798,780 B1
(45) Date of Patent: *Sep. 28, 2004

(54) TECHNIQUES FOR ACHIEVING HIGH RESPONSIVENESS FROM COMMUNICATING NODES, AND VERIFYING, MEASURING AND DETERRING ANY UNRESPONSIVENESS THEREOF

(75) Inventors: Asit Dan, Pleasantville, NY (US); Daniel M. Dias, Mahopac, NY (US); Arun K. Iyengar, Yorktown Heights, NY (US); Hidayatullah Shaikh, Yorktown Heights, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/195,909

(22) Filed: Nov. 19, 1998

(51) Int. Cl.[7] .............................................. H04L 12/28
(52) U.S. Cl. .................. 370/395.21; 370/216; 709/223
(58) Field of Search ................................. 370/216, 217, 370/221, 225, 248, 222; 709/238, 239; 714/1; 379/209.01, 210.01

(56) References Cited

U.S. PATENT DOCUMENTS

| | | | | |
|---|---|---|---|---|
| 3,854,014 A | * | 12/1974 | Akin et al. ............ | 379/209.01 |
| 3,928,729 A | * | 12/1975 | Nielson .................. | 379/204.01 |
| 4,186,380 A | * | 1/1980 | Edwin et al. ......... | 340/147 SC |
| 5,528,676 A | * | 6/1996 | Sussell et al. ............... | 379/111 |
| 5,644,624 A | * | 7/1997 | Caldwell ....................... | 379/69 |
| 5,852,408 A | * | 12/1998 | Christiansen et al. .. | 340/870.09 |
| 5,937,032 A | * | 8/1999 | Nummelin et al. ............ | 379/10 |
| 6,112,249 A | * | 8/2000 | Bader et al. ................. | 709/239 |
| 6,185,623 B1 | * | 2/2001 | Bailey et al. ................ | 709/238 |
| 6,278,769 B1 | * | 8/2001 | Bella ........................ | 379/29.11 |
| 6,286,111 B1 | * | 9/2001 | Snover ........................ | 370/403 |
| 6,310,881 B1 | * | 10/2001 | Zikan et al. ................ | 370/401 |

* cited by examiner

*Primary Examiner*—Hassan Kizou
*Assistant Examiner*—David Odland
(74) *Attorney, Agent, or Firm*—Rafael Perez-Pineiro, Esq.; Kevin P. Radigan, Esq.; Heslin Rothenberg Farley & Mesiti

(57) ABSTRACT

Techniques for establishing contact between a first node and a second node in a communication system having a plurality of nodes. Upon a failure of an attempt by the first node to contact the second node, the first node contacts a 3rd party node, which in turn attempts to contact the second node on behalf of the first node. The first node's initial attempt to contact the second node can be verified by the 3rd party node, thereby avoiding an unjust detriment to the first node. Multiple retries or 3rd party nodes can be used to attempt contact on behalf of the first node. Responsiveness of nodes can be measured, and subsequent penalties can be assessed, as a result of their unresponsiveness.

24 Claims, 4 Drawing Sheets

1 …

TECHNIQUES FOR ACHIEVING HIGH RESPONSIVENESS FROM COMMUNICATING NODES, AND VERIFYING, MEASURING AND DETERRING ANY UNRESPONSIVENESS THEREOF

TECHNICAL FIELD

The present invention relates to communication systems. More particularly, the present invention relates to overcoming a failure of a first node to contact a second node by using a third, intervening node to attempt to contact the second node; and additional techniques to verify, measure and deter such unresponsiveness.

BACKGROUND OF THE INVENTION

Electronic commerce is quickly becoming an integral part of the marketing and sales strategies for many companies. The development of the World Wide Web has contributed significantly to the development of modern electronic commerce since it is essentially a free communication medium over which multiple nodes can communicate, and exchange information, currency, orders, etc.

Predictably, responsiveness of nodes in such a system is of great concern to the users thereof. It is well known that software and/or hardware problems at a particular node can cause a decrease in its responsiveness or render the node completely unresponsive. Low response times can also be caused by intentional, potentially malicious blocking of requests entering a node from selected other nodes. Depending on the type of transaction involved, the unresponsiveness of one node may result in an unjust detriment to another node. For example, the failure of a customer node to establish timely contact with an unresponsive reservation system may cause the customer to miss a cancellation deadline and incur an unjust fee. All of these problems impede the overall responsiveness and effectiveness of, e.g., electronic commerce systems.

What is required therefore, are techniques for providing responses when none would otherwise exist, and verifying, measuring, and deterring unresponsiveness of communicating nodes in systems.

SUMMARY OF THE INVENTION

These problems are overcome and other advantages are provided by the present invention which in one aspect relates to a method for handling a failure of a first node to contact a second node in a communication system. A third node is used to contact the second node on behalf of the first node.

The attempt by the third node to establish this contact may advantageously be used as a verification that the first node attempted the prior contact by, e.g., recording a time at which the third node attempted contact, thereby verifying that the first node attempted contact at an earlier time.

If the third node fails to contact the second node, a fourth node or additional nodes can be used to attempt to contact the second node, or the third node may make repeated attempts to contact the second node on behalf of the first node.

The nodes normally are expected to communicate using an automated communication medium, however, the third party node may attempt to contact the second node using other forms of communication.

The present invention also relates to, in another aspect, measuring and deterring unresponsiveness, by assessing penalties to nodes based on their failure to respond to other nodes attempting to contact them. The penalty can be determined as a function of a number of times a node failed to respond and/or an amount of time other nodes were delayed as a result of a failure to respond.

The present invention relates to, in yet another aspect, the second node contacting a third node while it is failing to respond to the first node, to attempt to elicit a response therefrom. In view of this attempt by the second node itself to contact other nodes, a responsiveness penalty which would otherwise be assessed on the second node is decreased or eliminated.

By providing trusted "3rd party" nodes to contact responding nodes on behalf of contacting nodes, the present invention provides responsiveness from the responding nodes which would not otherwise exist, and can be used as a way of verifying the initial unresponsiveness of nodes to the contacting nodes. Further, the present invention provides response measurement techniques, as well as techniques (e.g., penalties) for deterring unresponsiveness. These techniques will improve the overall responsiveness and effectiveness of the communication system, and will also prevent unjust penalties from being assessed against nodes whose initial attempts at contact failed because of unresponsiveness, or against nodes that are attempting to respond or rectify their own unresponsiveness.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of the preferred embodiment(s) and the accompanying drawings in which:

DETAILED DESCRIPTION OF THE PREFERRED EMBODIMENT(S)

Figure 1:
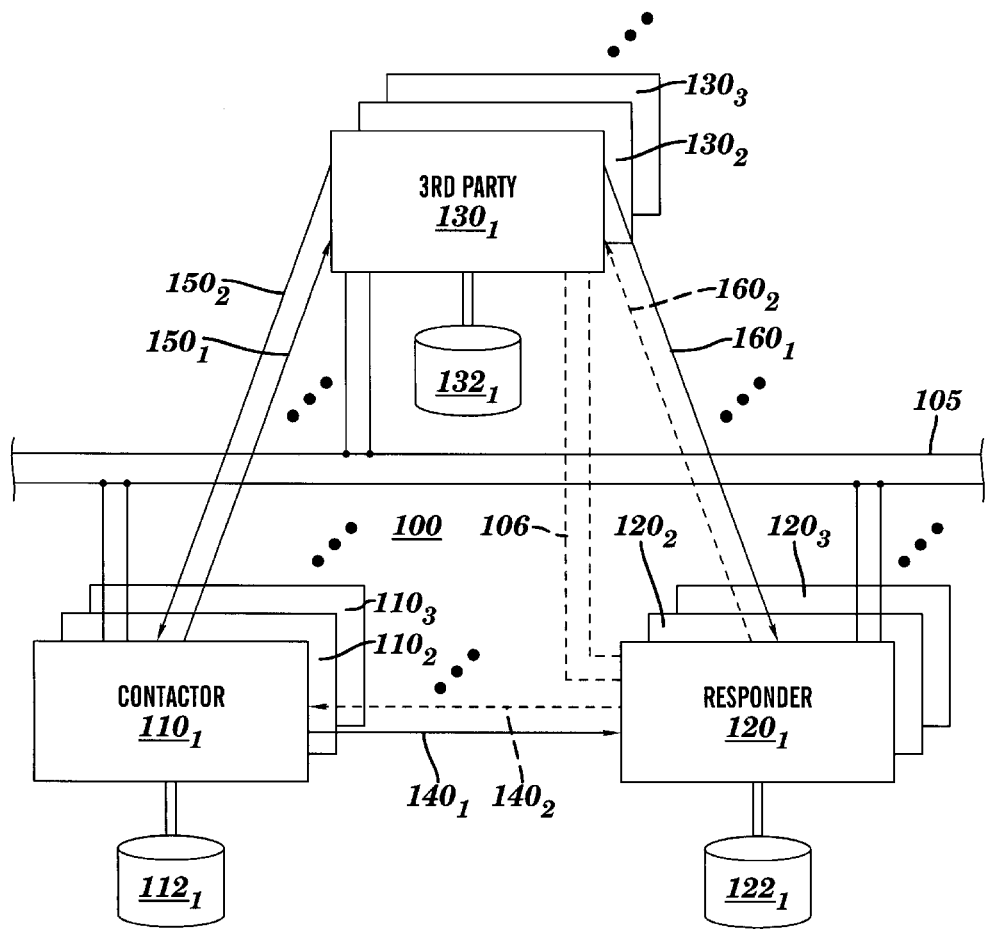
FIG. 1 depicts a communication system having contacting, responding and 3rd party nodes interconnected by a communication medium, in accordance with the principles of the present invention.

With reference to FIG. 1, a communication system 100 is provided, having an automated communication medium 105, connectable to which are one or more contactor nodes $110_1 \ldots 110_3$, one or more responder nodes $120_1 \ldots 120_3$, and one or more 3rd party nodes $130_1 \ldots 130_3$. The nodes may have connected thereto respective data storage devices (e.g., $112_1$, $122_1$ and $132_1$) upon which computer program product code means can be stored for facilitating any or all of the techniques of the present invention discussed herein.

Though the subject nodes are designated as contactors, responders and 3rd parties herein, those skilled in the art will recognize that any of the nodes in the system can concurrently provide any one or all three of these capabilities. Therefore, the use of the terms "contactor", "responder" and "3rd party" herein should not be construed as limiting the function of the subject node. Further, the term "node" is broadly used herein and connotes any identifiable combination of hardware and/or software to or from which contacts or responses are passed in an automated fashion.

As summarized above, the present invention is directed to a contactor node (e.g., $110_1$) attempting $140_1$, to contact, over medium 105, a responder node (e.g., $120_1$). If the responder node $120_1$, fails to provide a response $140_2$, a 3rd party node (e.g., $130_1$) is contacted via contact/response pair 150 over medium 105. The 3rd party node $130_1$ in turn attempts $160_1$ to contact responder node $120_1$, on behalf of the contactor node. Should a response $160_2$ be successfully received, a positive response may be sent to contactor $110_1$, or alternatively, if response $160_2$ is not received, a negative response may be sent to contactor $110_1$ and other steps taken (as discussed further below).

The contact/response pairs e.g., 140, 150 and 160, are drawn separately herein for clarity, but are assumed to be implemented using the media 105 or 106. Further, the contact/response pairs may include data, especially for one-time transactions. 3rd party node $130_1$ may attempt to contact responder $120_1$ either over automated communication medium 105, here shown commonly connectable to all of the nodes in the system (e.g., the World Wide Web), or alternatively, via an alternate communication medium 106. The alternate communication medium may include, but is not limited to, human intervention, telephone and non-electronic mail.

As discussed above, there is often a need to verify the first attempt $140_1$ to elicit a response $140_2$ from node $120_1$. In this regard, the 3rd party node's notification $150_1$ and subsequent involvement, including possibly another attempt $160_1$ can be used to verify the first attempt $140_1$, especially if the third party is designated as "trusted" by all nodes in the system to perform such functions. A time stamp of attempt $160_1$ can also be used to verify that attempt $140_1$ occurred earlier. By verifying attempt $140_1$, using a third party, an unjust detriment to node $110_1$ can be avoided, e.g., a fee for missing a cancellation deadline when the cancellation would have been made but for the unresponsiveness of node $120_1$.

Figure 2:
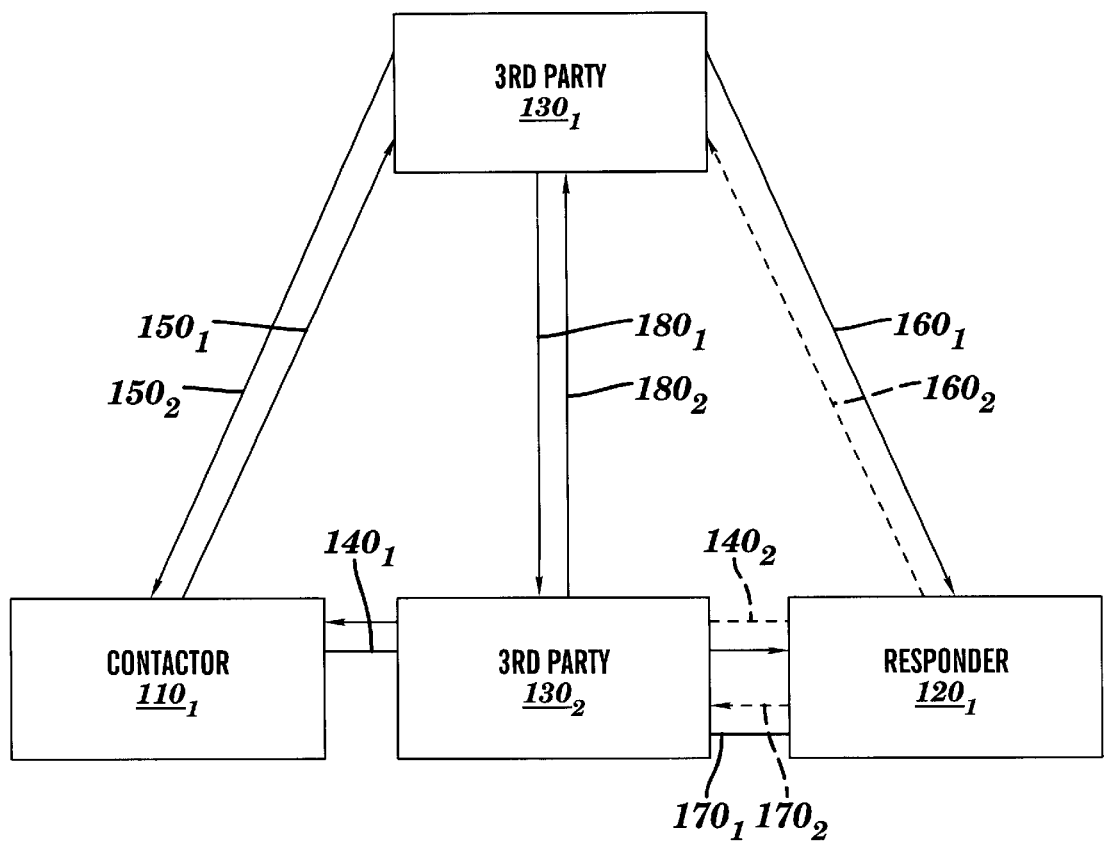
FIG. 2 depicts the use of multiple 3rd party nodes for establishing contact between a contactor and a responder.

3rd party node $130_1$ may repeatedly attempt to contact node $120_1$, or the assistance of other 3rd party nodes may be enlisted as in FIG. 2. If contactor node $110_1$ requires data to be sent to responder node $120_1$, 3rd party node can be instructed to deliver the data when node $120_1$ becomes available (e.g., after repeated attempts at contact).

FIG. 2 depicts an enhanced embodiment of the present invention in which contactor $110_1$ is attempting $140_1$ to contact responder $120_1$. As discussed above, upon a failure to elicit a response $140_2$, contactor $110_1$ contacts 3rd party $130_1$ which in turn attempts to contact responder $120_1$ via contact/response pair 160. If this fails, either contactor $110_1$ or 3rd party $130_1$ can contact yet another 3rd party $130_2$ (e.g., via contact/response pair 180), which in turn will attempt to contact responder $120_1$ via contact/response pair 170. Additional 3rd parties can be used until a response is successfully received from responder $120_1$. Therefore, in accordance with the present invention, there may be a single 3rd party, or there may be multiple 3rd parties as shown in FIG. 2. At least some of the multiple 3rd party nodes may operate cooperatively as a single logical entity. Alternatively, or in addition, at least some of the multiple 3rd party nodes may operate autonomously as different, independent 3rd party nodes. The use of multiple 3rd party nodes allows the system to handle greater request traffic than were a single node used to handle all 3rd party functions. In addition, multiple 3rd party nodes can be used to achieve high availability, and to compensate for the potential of one or more 3rd party nodes failing.

Figure 3:
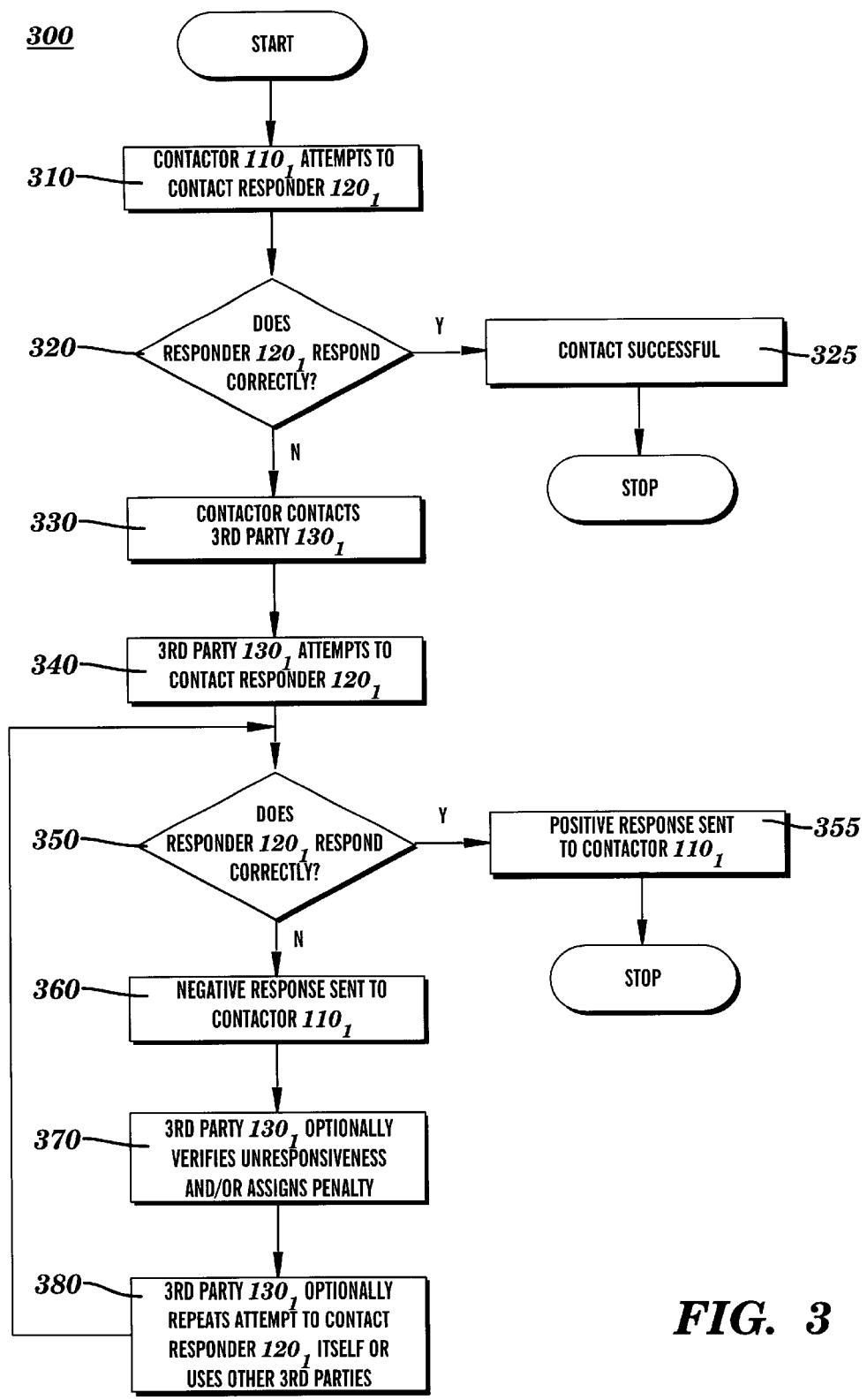
FIG. 3 is a flow diagram of one embodiment of the present invention for handling an unresponsive responder.

FIG. 3 is a flow diagram 300 of the approach discussed above with respect to FIGS. 1 and 2 but with additional detail, and enhanced "penalty" features. In Step 310, contactor $110_1$ attempts to contact responder $120_1$, which is followed by an Inquiry 320 in which it is determined whether the responder $120_1$ is responding correctly. If so, the contact is successful 325; if not the contactor contacts the 3rd party $130_1$ in Step 330. The 3rd party $130_1$ attempts to contact the responder $120_1$ in Step 340. Inquiry 350 follows in which it is determined whether the responder $120_1$ responds correctly. If so, a positive response may be sent to the contactor $110_1$, Step 355. If not, a negative response may be sent to the contactor $110_1$ in Step 360. At this time, and as discussed further herein, the 3rd party $130_1$ may optionally verify this unresponsiveness and/or assign a penalty 370 to responder $120_1$ due to its lack of response.

The 3rd party may also optionally repeat its attempt to contact responder $120_1$ in Step 380. The method then returns to the Inquiry 350 regarding whether the responder $120_1$ is responding. As discussed above, the 3rd party may comprise multiple 3rd party nodes, as depicted in FIG. 2, and these multiple 3rd party nodes 130 may all be used in Steps 340 and/or 380 to attempt to contact the responder $120_1$.

The Step 370 penalty may include a financial assessment against the node, the amount of which may be based on one or more of the following: the number of times the responder failed to respond to the contactor; the number of times one or more contactors were delayed as a result of the responder failing to respond; and/or the number of times the responder failed to respond to one or more 3rd party nodes. Another exemplary penalty involves a responsiveness rating which may be accordingly increased or decreased, and communicated to interested nodes in the system. A lower rating will penalize the subject node by discouraging others from communicating with it, and a higher rating will encourage others to communicate with this node.

Figure 4:
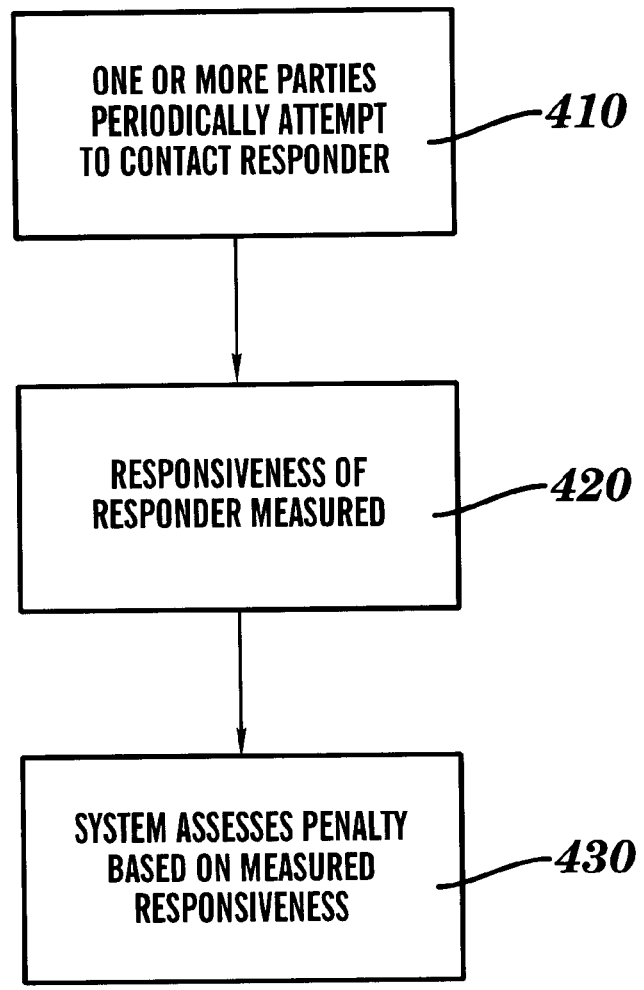
FIG. 4 is a flow diagram of an embodiment of the present invention in which a 3rd party node measures the responsiveness of a responder, and a subsequent penalty is assessed.

A further refinement of this penalty assessment technique is depicted in the flow diagram 400 of FIG. 4, in which one or more 3rd parties periodically attempts to contact the responder in Step 410. A responsiveness of the responder is measured (Step 420), based on the success and/or failure encountered in trying to establish contact therewith. This responsiveness information can be provided to contactors 110 if they request the information or if they are having problems contacting a specific responder.

This responsiveness measurement can also be used to optionally assess a separate penalty (e.g., financial assessment) against the responder, the level of which can be based on the measured responsiveness (Step 430).

To minimize the time during which the responder is unresponsive, the responder itself can periodically send status messages to the 3rd parties. If any such 3rd party receives the message, the 3rd party sends a return message to the responder. If the responder fails to receive a return message from the 3rd party, it can itself attempt to rectify its own problem and possibly contact the 3rd party using a different, alternate communication medium. This alternate communication indicates that the responder is aware of the problem, is working to fix it, and estimates the time when it will be responsive again. This information can be stored at the 3rd party and can be passed to any contactor which is interested in contacting the responder. In one embodiment, this out of band communication from the responder to the 3rd party can prevent or minimize the penalty being assessed due to the responder's unresponsiveness, in view of its attempts to rectify the problem.

This technique is also useful for partitioned networks wherein network boundaries may prevent communication between certain nodes. By maintaining contact with "trusted" nodes in its own partition, a node will prevent penalties assessed by nodes outside of its partition that cannot make the required cross-partition contact. In this regard, in a partitioned system, the contacting and/or 3rd party nodes discussed above should be made aware of the partitioning when attempting contact with other nodes, to avoid unexplained unresponsiveness and/or avoid assessing unjustified penalties against nodes which are not responding due only to the partitioning.

Contactors can also send messages (encrypted if necessary), after a communication path has been established with the subject responder, either through the 3rd party or directly between the contactor and responder. Further, the 3rd parties can have security requirements imposed on them, such that they are "trusted" to a group of contactors i.e., can be trusted to attempt to contact and/or pass private messages to the relevant responder, or be trusted to accurately collect and store information about other nodes in the system.

Described herein are techniques for attempting to obtain a response from a node (through a third party) following an initial failure; and related techniques for verifying and measuring unresponsiveness and/or assessing penalties based thereon, to deter future node unresponsiveness. The present invention therefore improves the overall effectiveness and reliability of communication between nodes in, for example, an electronic commerce system using the World Wide Web.

While the invention has been particularly shown and described with reference to preferred embodiment(s) thereof, it will be understood by those skilled in the art that various changes in form and details may be made therein without departing from the spirit and scope of the invention.

We claim the following:

1. A communication system having at least a first computing node, a second computing node and a third computing node, the communication system comprising:

means for the first computing node of the communication system attempting to contact the second computing node of the communication system;

means for, upon the second computing node failing to correctly respond to the attempt by the first computing node to contact the second computing node, the third computing node attempting to contact the second computing node on behalf of the first computing node, wherein the third computing node's attempt is responsive to the second computing node failing to respond to the first computing node; and means for assessing a penalty to the second computing node based on the second computing node failing to respond to at least one of the first computing node and the third computing node, wherein the penalty comprises a financial assessment against the second computing node, and wherein the penalty is determined as a function of at least one of the following:

number of times the second computing node failed to respond to the first computing node;

an amount of time the first computing node or other computing nodes were delayed as a result of the second computing node failing to respond thereto; and a number of times the second computing node failed to respond to the third computing node or other computing nodes.

2. The system of claim 1, further comprising:

means for using said third computing node attempting to contact the second computing node to verify that the first computing node attempted to contact the second computing node.

3. The system of claim 2, wherein said means for using includes means for recording a time of said third computing node attempting to contact the second computing node on behalf of the first computing node to verify that the first computing node attempted to contact the second computing node at an earlier time.

4. The system of claim 1, further comprising:

means for handling a failure of the third computing node to contact the second computing node by using a fourth computing node to attempt to contact the second computing node on behalf of the first computing node.

5. The system of claim 1, wherein the first computing node and the second computing node normally communicate using a first automated communication medium, and wherein said means for using a third computing node includes means for using a second automated communication medium.

6. An article of manufacture comprising a computer usable medium having computer readable program code means embodied therein for implementing a communications method in a communication system including a first computing node, a second computing node, and a third computing node, the computer readable program code means comprising:

code means for a first computing node of the communication system attempting to contact a second computing node of the communication system;

code means for, upon the second computing node failing to correctly respond to the attempt by the first computing node to contact the second computing node, a third computing node of the communication system attempting to contact the second computing node on behalf of the first computing node, the third computing node's attempt being responsive to the second computing node failing to respond to the first computing node; and code means for assessing a penalty to the second computing node based on the second computing node failing to respond to at least one of the first computing node and the third computing node, wherein the penalty comprises a financial assessment against the second computing node, and wherein the penalty is determined as a function of at least one of the following:

a number of times the second computing node failed to respond to the first computing node;

an amount of time the first computing node or other computing nodes were delayed as a result of the second computing node failing to respond thereto; and a number of times the second computing node failed to respond to the third computing node or other computing nodes.

7. The article of manufacture of claim 6, further comprising:

code means for using said third computing node attempting to contact the second computing node to verify that the first computing node attempted to contact the second computing node.

8. The article of manufacture of claim 7, wherein said code means for using includes code means for recording a time of said third computing node attempting to contact the second computing node on behalf of the first computing node to verify that the first computing node attempted to contact the second computing node at an earlier time.

9. The article of manufacture of claim 6, wherein the first computing node and the second computing node normally communicate using a first automated communication medium, and wherein said code means for using a third computing node includes code means for using a second automated communication medium.

10. A communications method for a computing environment including a first computing node, a second computing node, and a third computing node, said method comprising:
    attempting, by a first computing node of the computing environment, to initiate contact, in an automated fashion, with a second computing node of the computing environment; and
    determining whether the second computing node responds correctly to the first computing node's attempt to initiate contact with the second computing node, and if not, then responsive thereto, attempting by a third computing node of the computing environment to initiate contact, in an automated fashion, with the second computing node, and determining whether the second computing node responds correctly to the third computing node's attempt to initiate contact with the second computing node; and
    assessing a penalty to the second computing node based on the second computing node failing to respond to at least one of the first computing node and the third computing node, wherein the penalty comprises decreasing a responsiveness rating of the second computing node, wherein the penalty is determined as a function of an amount of time the first computing node or other computing nodes were delayed as a result of the second computing node failing to respond thereto.

11. The method of claim 10, wherein responsive to said determining whether the second computing node responds correctly to the third computing node's attempt to initiate contact with the second computing node, the method further comprises advising the first computing node whether the second computing node correctly responds to the third computing node's attempt to initiate contact with the second computing node.

12. The method of claim 11, wherein responsive to the second computing node failing to correctly respond to the third computing node's attempt to initiate contact with the second computing node, the method further comprises verifying unresponsiveness of the second computing node.

13. The method of claim 12, wherein said verifying unresponsiveness includes recording a time of the third computing node attempting to initiate contact with the second computing node to verify that the first computing node attempted to initiate contact with the second computing node at an earlier time.

14. A communication system of a computing environment, said system comprising:
    a first computing node, a second computing node and a third computing node; and
    wherein the first computing node is adapted to initiate contact, in an automated fashion, with the second computing node of the communication system, and is adapted to determine whether the second computing node correctly responds to the first computing node's attempt to initiate contact with the second computing node, and if not, then responsive thereto the third computing node is adapted to attempt to initiate contact, in an automated fashion, with the second computing node, and to determine whether the second computing node responds correctly to the third computing node's attempt to automatedly initiate contact with the second computing node; and
    wherein the third computing node is adapted to assess a penalty to the second computing node based on the second computing node failing to respond to at least one of the first computing node and the third computing node, wherein the penalty comprises decreasing a responsiveness rating of the second computing node, wherein the penalty is determined as a function of an amount of time the first computing node other computing nodes were delayed as a result of the second computing node failing to respond thereto.

15. The system of claim 14, further comprising means for advising the first computing node whether the second computing node correctly responds to the third computing node's attempt to initiate contact with the second computing node.

16. The system of claim 14, further comprising means for verifying unresponsiveness of the second computing node.

17. The system of claim 16, wherein said means for verifying unresponsiveness includes means for recording a time that the third computing node attempted to initiate contact with the second computing node to verify whether the first computing node attempted to initiate contact with the second computing node at an earlier time.

18. At least one program storage device readable by a machine, tangibly embodying at least one program of instructions executable by the machine to perform a communications method for a computing environment including a first computing node, a second computing node, and a third computing node, the method comprising:
    attempting by a first computing node of the computing environment, to initiate contact, in an automated fashion, with a second computing node of the computing environment; and
    determining whether the second computing node responds correctly to the first computing node's attempt to initiate contact with the second computing node, and if not, then responsive thereto, attempting by a third computing node of the computing environment to initiate contact, in an automated fashion, with the second computing node, and determining whether the second computing node responds correctly to the third computing node's attempt to initiate contact with the second computing node; and
    assessing a penalty to the second computing node based on the second computing node failing to respond to at least one of the first computing node and the third computing node, wherein the penalty comprises decreasing a responsiveness rating of the second computing node, wherein the penalty is determined as a function an amount of time the first computing node or other computing nodes were delayed as a result of the second computing node failing to respond thereto.

19. A communications method for a communication system including a first computing node, a second computing node, and a third computing node, the method comprising:
    a first computing node of the communication system attempting to contact a second computing node of the communication system;
    the second computing node failing to respond to the attempt by the first computing node to contact the second computing node;

a third computing node of the communication system attempting to contact the second computing node on behalf of the first computing node, the third computing node's attempt being responsive to the second computing node failing to respond to the first computing node; and assessing a penalty to the second computing node based on the second computing node failing to respond to at least one of the first computing node and the third computing node, wherein the penalty comprises a financial assessment against second computing node, and wherein the penalty is determined as a function of at least one of the following:

a number of times the second computing node failed to respond to the first computing node;

an amount of time the first computing node or other computing nodes were delayed as a result of the second computing node failing to respond thereto; and a number of times the second computing node failed to respond to the third computing node or other computing nodes.

20. The method of claim 19, further comprising:

using said third computing node attempting to contact the second computing node to verify that the first computing node attempted to contact the second computing node.

21. The method of claim 20, wherein said using includes recording a time of said third computing node attempting to contact the second computing node on behalf of the first computing node to verify that the first computing node attempted to contact the second computing node at an earlier time.

22. The method of claim 19, further comprising:

the second computing node failing to respond to the third computing node; and plurality of computing nodes each attempting to contact the second computing node on behalf of the first computing node until one of said plurality of computing nodes successfully contacts the second computing node on behalf of the first computing node.

23. The method of claim 19 further comprising designating the third computing node as a trusted computing node, wherein the trusted computing node is trusted by the first computing node and the second computing node to accurately perform collecting and storing of information associated with the second computing node failing to respond to the first computing node.

24. The method of claim 19 further comprising collecting and storing information associated with at least one of verifying the second computing node failing to respond to the first computing node and assessing the penalty to the second computing node based on the second computing node failing to respond.

* * * * *

UNITED STATES PATENT AND TRADEMARK OFFICE
CERTIFICATE OF CORRECTION

PATENT NO. : 6,798,780 B1
DATED : September 28, 2004
INVENTOR(S) : Dan et al.

It is certified that error appears in the above-identified patent and that said Letters Patent is hereby corrected as shown below:

Column 5,
Line 63, insert an -- a -- before the word "number" at the beginning of the sentence Column 10,
Line 9, insert an -- a -- before the word "plurality" at the beginning of the sentence Signed and Sealed this Fourth Day of January, 2005

JON W. DUDAS
*Director of the United States Patent and Trademark Office*